(12) United States Patent
Tanaka (10) Patent No.: US 11,677,464 B2
(45) Date of Patent: Jun. 13, 2023

(54) OPTICAL TRANSCEIVER AND METHOD FOR CONTROLLING OPTICAL TRANSCEIVER

(71) Applicant: SUMITOMO ELECTRIC INDUSTRIES, LTD., Osaka (JP)

(72) Inventor: Yasuhiro Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/455,755

(22) Filed: Nov. 19, 2021

(65) Prior Publication Data

US 2022/0166501 A1 May 26, 2022

(30) Foreign Application Priority Data

Nov. 24, 2020 (JP) .............................. JP2020-194066

(51) Int. Cl.
*H04B 10/40* (2013.01)
*H04B 10/077* (2013.01)
*H04L 7/00* (2006.01)

(52) U.S. Cl.
CPC ......... *H04B 10/0775* (2013.01); *H04B 10/40* (2013.01); *H04L 7/0075* (2013.01)

(58) Field of Classification Search
CPC ... H04B 10/40; H04B 10/077; H04B 10/0779
See application file for complete search history.

(56) References Cited

U.S. PATENT DOCUMENTS

| 2005/0226201 | A1* | 10/2005 | McMillin | .............. | H04W 88/04 370/348 |
| 2010/0054733 | A1* | 3/2010 | Hosking | ................ | H04B 10/40 398/25 |
| 2013/0076543 | A1* | 3/2013 | Yang | ...................... | H03M 5/02 341/70 |
| 2015/0349985 | A1* | 12/2015 | Dallmann | ............... | H03M 5/12 375/340 |

FOREIGN PATENT DOCUMENTS

JP 2005-142615 6/2005

* cited by examiner

*Primary Examiner* — Nathan M Cors
(74) *Attorney, Agent, or Firm* — IPUSA, PLLC (57) ABSTRACT

An optical transceiver is configured to receive an optical signal on which a monitoring signal encoded by Manchester encoding is superimposed. The optical transceiver includes a decoding circuit configured to decode the monitoring signal from an electrical signal generated from the optical signal. The decoding circuit includes an interval measuring unit and a decoding unit. The interval measuring unit is configured to detect only a rising edge or a falling edge of a waveform of the electrical signal, to measure a first time interval between a detected first edge and a second edge detected immediately after detecting the first edge, and to measure a second time interval between the second edge and a third edge detected immediately after detecting the second edge. The decoding unit is configured to decode the monitoring signal encoded by the Manchester encoding based on a ratio between the first and second time intervals.

11 Claims, 8 Drawing Sheets

| NUMBER | CHANGE IN EDGE INTERVAL T | RATIO R(n)=D(n)/D(n-1) |
|---|---|---|
| (1) | D(n-1)=2T, D(n)=T | R(n)=1/2=0.5 |
| (2) | D(n-1)=1.5T, D(n)=T | R(n)=1/1.5=0.67 |
| (3) | D(n-1)=2T, D(n)=1.5T | R(n)=1.5/2=0.75 |
| (4) | D(n-1)=T, D(n)=T<br>D(n-1)=1.5T, D(n)=1.5T<br>D(n-1)=2T, D(n)=2T | R(n)=1 |
| (5) | D(n-1)=1.5T, D(n)=2T | R(n)=2/1.5=1.33 |
| (6) | D(n-1)=T, D(n)=1.5T | R(n)=1.5/1=1.5 |
| (7) | D(n-1)=T, D(n)=2T | R(n)=2/1=2 |

OPTICAL TRANSCEIVER AND METHOD FOR CONTROLLING OPTICAL TRANSCEIVER

CROSS-REFERENCE TO RELATED APPLICATION

The present application is based on and claims priority to Japanese Patent Application No. 2020-194066 filed on Nov. 24, 2020, the entire contents of which are hereby incorporated herein by reference.

BACKGROUND OF THE INVENTION

1. Field of the Invention

The present disclosure relates to an optical transceiver and a method for controlling an optical transceiver.

2. Description of the Related Art

Manchester code is a code that assigns each of two logical values to be transmitted to a rising edge and a falling edge of a signal waveform. For example, a receiver that generates a code value and a synchronized clock from the Manchester code data measures the time of the edge interval of either the rising edge or the falling edge of the received signal. The receiver determines whether the edge of the time is a bit middle point or a bit end point from the measured time and generates a code value and a synchronized clock, as described in Japanese Patent Application Laid-Open No. 2005-142615.

However, the receiver that decodes the Manchester code described above cannot generate a code value unless the receiver knows the bit width that is the period of the synchronized clock included in the Manchester code data. Therefore, when the bit width varies due to changes in temperature of the receiver or changes over time, and the like, and further when the bit width exceeds an allowable error of variation, there is a concern that the code value of the Manchester code cannot be correctly decoded.

The Manchester code has an ambiguity in which a pattern having the same consecutive code values and a pattern having opposite consecutive code values cannot be distinguished from each other. For this reason, when Manchester code is attempted to be received from midstream, a code value opposite to the expected code value may be decoded.

Thus, the present disclosure is intended to provide an optical transceiver capable of decoding a code value of Manchester code even when a period of a synchronized clock used in Manchester encoding is unknown or when the period of the synchronized clock varies.

SUMMARY OF THE INVENTION

An optical transceiver according to an embodiment of the present disclosure is configured to receive an optical signal on which a monitoring signal encoded by Manchester encoding is superimposed, and includes a decoding circuit configured to decode the monitoring signal from an electrical signal generated from the optical signal. The decoding circuit includes an interval measuring unit and a decoding unit. The decoding circuit is configured to detect only a rising edge or a falling edge of a waveform of the electrical signal, to measure a first time interval between a detected first edge and a second edge detected immediately after detecting the first edge, and to measure a second time interval between the second edge and a third edge detected immediately after detecting the second edge. The decoding unit is configured to decode the monitoring signal encoded by the Manchester encoding based on a ratio between the first time interval and the second time interval.

Additional objects and advantages of the embodiments are set forth in part in the description which follows, and in part will become obvious from the description, or may be learned by practice of the disclosure. The objects and advantages of the disclosure will be realized and attained by means of the elements and combinations particularly pointed out in the appended claims. It is to be understood that both the foregoing general description and the following detailed description are exemplary and explanatory and are not restrictive of the disclosure as claimed.

DETAILED DESCRIPTION OF THE PREFERRED EMBODIMENTS

Description of Embodiments of the Present Disclosure

First, embodiments of the present disclosure will be described by listing.

[1] An optical transceiver according to an embodiment of the present disclosure is configured to receive an optical signal on which a monitoring signal encoded by Manchester encoding is superimposed, and includes a decoding circuit configured to decode the monitoring signal from an electrical signal generated from the optical signal, the decoding circuit including an interval measuring unit configured to detect only a rising edge or a falling edge of a waveform of the electrical signal, to measure a first time interval between a detected first edge and a second edge detected immediately after detecting the first edge, and to measure a second time interval between the second edge and a third edge detected immediately after detecting the second edge, and a decoding unit configured to decode the monitoring signal encoded by the Manchester encoding based on a ratio between the first time interval and the second time interval. This allows the optical transceiver to decode the monitoring signal encoded by the Manchester coding based on the ratio between consecutive first and second time intervals, even when a period of a synchronized clock used in the Manchester encoding is unknown or even when the period of the synchronized clock varies.

[2] In the above [1], the decoding unit may include a clock number estimating unit configured to estimate a number of clocks of the second time interval with respect to a period of a synchronized clock used in the Manchester encoding of the monitoring signal based on the ratio between the first time interval and the second time interval, and a code value determining unit configured to decode the monitoring signal encoded by the Manchester encoding based on the estimated number of clocks of the second time interval and a logical value of the monitoring signal decoded immediately before. By measuring the first and second time intervals and determining the number of clocks of the second time interval from the ratio of the time interval, the monitoring signal encoded by the Manchester encoding can be decoded even when the period of the synchronized clock is unknown. In addition, the bit width that is the period of the synchronized clock can be determined from the number of clocks in the second time interval.

[3] In the above [2], the clock number estimating unit may include a storage unit configured to store the first time interval, a plurality of multipliers multiplying the first time interval by each of a plurality of thresholds, and a plurality of comparators configured to compare each of a plurality of multiplication results from the plurality of multipliers to the second time interval, wherein the clock number estimating unit may estimate the number of clocks based on a plurality of comparative results from the plurality of comparators. This allows the number of clocks in the second time interval to be estimated and the monitoring signal to be decoded by performing multiplication by a multiplier instead of division to obtain the ratio between the consecutive first time interval and the second time interval. As a result, the circuit size of the decoding unit can be inhibited, and the cost of the optical transceiver can be reduced.

[4] In [1], the interval measuring unit may further measure a third time interval between the third edge and a fourth edge detected immediately after detecting the third edge, and the decoding unit may be configured to decode a first logical value corresponding to the third edge of the monitoring signal based on the ratio between the first time interval and the second time interval and to decode a second logical value corresponding to the fourth edge of the monitoring signal based on the ratio between the second time interval and the third time interval. Thus, the decoding unit can sequentially determine consecutive code values of the Manchester code using consecutive pairs of two time intervals.

[5] In [1], upon detecting by the decoding unit that the ratio between the first time interval and the second time interval is out of a predetermined range, the interval measuring unit may further measure a third time interval between the third edge and a fourth edge detected immediately after detecting the third edge, and a fourth time interval between the fourth edge and a fifth edge detected immediately after detecting the fourth edge, and the decoding unit may decode the monitoring signal based on the ratio between the third time interval and the fourth time interval. This allows the decoding unit to resume decoding of the monitoring signal encoded by the Manchester encoding again without continuing to detect an incorrect code value.

[6] In [1], the monitoring signal encoded by the Manchester encoding and received by the decoding circuit may include a correction pattern in which a first logical value, a first logical value, a second logical value, and a first logical value sequentially appear, and the first logical value may be indicated by a rising edge or a falling edge detected by the interval measuring unit. Therefore, for example, when the code of the first consecutive logical value continues to be erroneously detected as the code of the second consecutive logical value, the decoding unit can return the received operation of the code value to normal by receiving the correction pattern and can detect the correct code value thereafter.

[7] A method for controlling an optical transceiver according to another embodiment of the present disclosure is a method for controlling an optical transceiver configured to receive an optical signal on which a monitoring signal encoded by Manchester encoding is superimposed and to decode the monitoring signal from an electrical signal generated from the optical signal, and in the method, only a rising edge or a falling edge of a waveform of the electrical signal is detected; a first time interval between a detected first edge and a second edge detected immediately after detecting the first edge is measured; a second time interval between the second edge and a third edge detected immediately after detecting the second edge is measured; and the monitoring signal encoded by the Manchester encoding based on a ratio between the first time interval and the second time interval is decoded. This allows the optical transceiver to decode the monitoring signal encoded by the Manchester encoding based on the ratio between consecutive first and second time intervals, even when the period of the synchronized clock used in the Manchester encoding is unknown or even when the period of the synchronized clock varies.

Details of Embodiments of the Present Disclosure

An embodiment of an optical transceiver of the present disclosure will be described with reference to the drawings. In the following description, identical symbols are provided for identical elements or corresponding elements, and the description thereof may be omitted. Symbols of the input terminal, the output terminal, and each node are also used as symbols of signals.

Embodiment

[Optical Transceiver Circuit Configuration]

Figure 1:
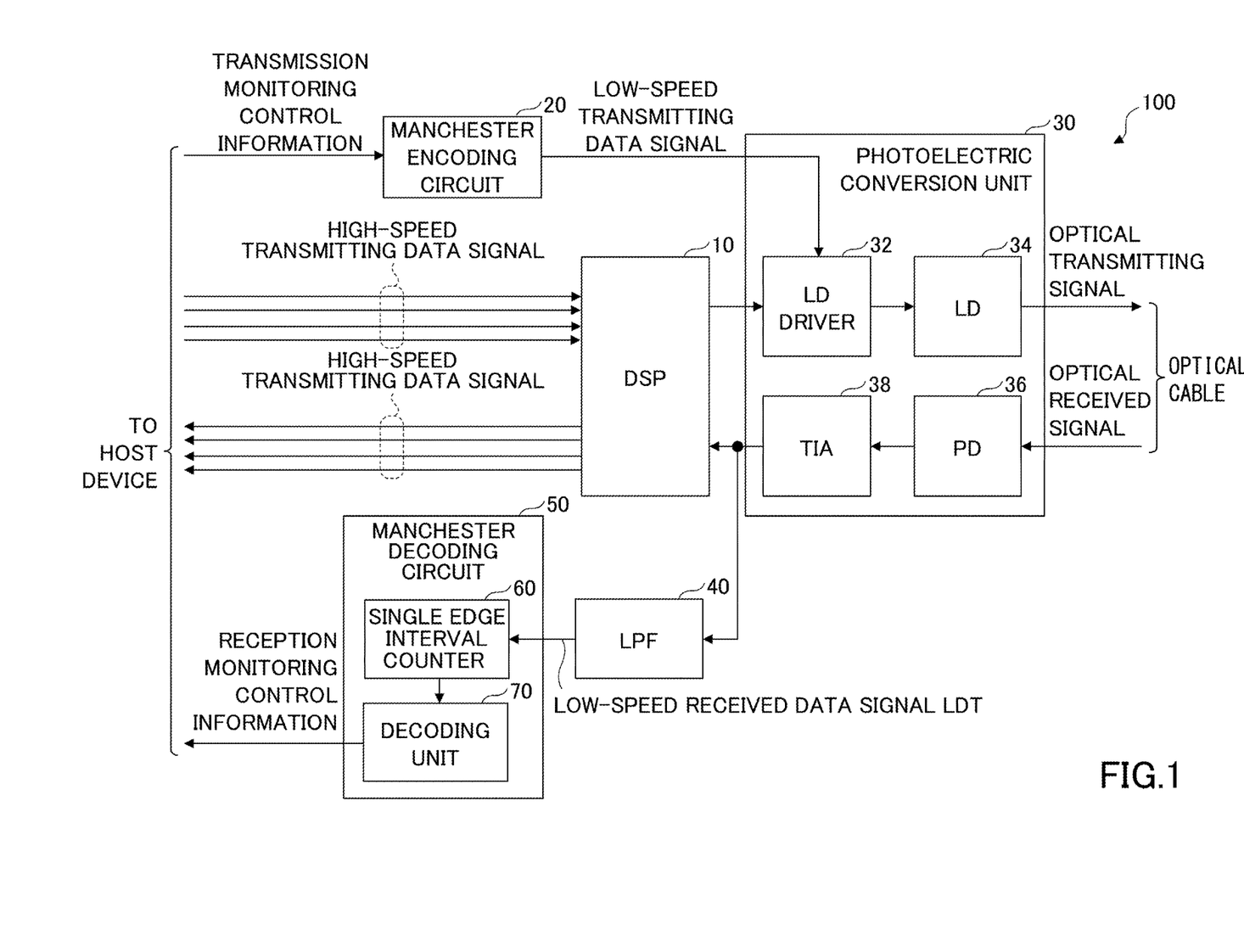
FIG. 1 is a block diagram illustrating an example of a circuit configuration of an optical transceiver according to an embodiment.

FIG. 1 is a block diagram illustrating an example of a circuit configuration of an optical transceiver according to an embodiment. For example, an optical transceiver 100 illustrated in FIG. 1 is connected to a communication device, such as a host device, which transmits and receives optical signals. The optical transceiver 100 has a function of converting a digital signal into an optical signal and transmitting the optical signal to another optical transceiver, and converting the optical signal received from another optical transceiver into a digital signal. The optical transceiver 100 includes a DSP (Digital Signal Processor) 10, a Manchester encoding circuit 20, a photoelectric conversion unit 30, a low pass filter (LPF) 40, and a Manchester decoding circuit 50.

The photoelectric conversion unit 30 includes a laser diode (LD) driver 32, a laser diode (LD) 34, a photodiode (PD) 36, and a transimpedance amplifier (TIA) 38. Hereinafter, the laser diode driver 32, the laser diode 34, the photodiode 36, and the transimpedance amplifier 38 are also referred to as an LD driver 32, an LD 34, a PD 36, and a TIA 38, respectively. Also, the low pass filter 40 is referred to as an LPF 40. The Manchester decoding circuit 50 includes a single-edge interval counter 60 and a decoding unit 70. The Manchester decoding circuit 50 is an example of a decoding circuit.

The DSP 10 receives from the host device a parallel high-speed transmitting data signal (digital signal) containing information to be transmitted to another optical transceiver 100. The DSP 10 converts the received high-speed transmitting data signal to an analog transmitting signal such as, for example, a PAM (Pulse Amplitude Modulation) 4 signal. The DSP 10 outputs the converted analog transmitting signal to the LD driver 32.

The DSP 10 also receives an analog received signal from the TIA 38, such as a PAM4 signal converted from an optical signal received from the other optical transceiver 100. The DSP 10 converts the analog received signal into a high-speed received data signal (digital signal) in parallel. The DSP 10 outputs the converted high-speed received data signal to the host device. The DSP 10 includes a high pass filter (not illustrated). The high pass filter removes monitoring control information superimposed on the analog received signal received from the TIA 38.

For example, the high-speed transmitting data signal and the high-speed received data signal are NRZ (Non-Return-to-Zero) signals. The interconversion of the high-speed transmitting data signal and the high-speed received data signal with the PAM4 signals may take place in a conversion circuit connected between the DSP 10 and, the LD driver 32 and TIA 38.

The Manchester encoding circuit 20 encodes monitoring control information (transmission monitoring control information) for transmission by Manchester encoding and outputs the encoded monitoring control information as a low-speed transmitting data signal for monitoring to the LD driver 32. The transfer rate of the monitoring low-speed transmitting data signal is lower than the transfer rate of the data signal to be transmitted and received by the DSP 10. For example, the frequency of the low-speed transmitting data signal output from the Manchester encoding circuit 20 is about tens of kHz to about one MHz, whereas the PAM4 signal transmitted to and received from the DSP 10 is about 25G baud.

The LD driver 32 superimposes the low-speed transmitting data signal containing monitoring control information on an analog transmitting signal received from the DSP 10. The LD driver 32 outputs the superimposed analog transmitting signal to the LD 34 to drive the LD 34. The LD 34 generates an optical transmitting signal from the analog transmitting signal (an electrical signal) in which the low-speed transmitting data signal is superimposed, and outputs the generated optical transmitting signal to the optical cable.

For example, the optical signal output from the LD 34 is a PAM4 signal. The superimposition of the low-speed transmitting data signal for monitoring on the analog transmitting signal may be performed by changing the bias current supplied to the LD driver 32 in response to the low-speed transmitting data signal.

The PD 36 receives the superimposed optical reception signal from another optical transceiver 100 via an optical cable. The PD 36 generates a current signal (an electrical signal) from the received optical reception signal and outputs the generated current signal to the TIA 38. For example, the optical signal received by the PD 36 is the PAM4 signal. The TIA 38 amplifies the minute current signal received from the PD 36 and outputs the amplified current signal as a voltage signal (analog received data signal) to the DSP 10 and the LPF 40.

The LPF 40 cuts off the high frequency component of the serially received data signal received from the TIA 38 to extract the low-speed received data signals superimposed on the received data signals (the monitoring control information encoded by Manchester encoding). The LPF 40 outputs the extracted low-speed received data signal to the Manchester decoding circuit 50. The low-speed received data signal is an example of a Manchester encoded monitoring signal.

The Manchester decoding circuit 50 decodes the Manchester encoded low-speed received data signal using a single-edge interval counter 60 and a decoding unit 70. The Manchester decoding circuit 50 outputs the decoded low-speed received data signal as reception monitoring control information to the host device.

Figure 6:
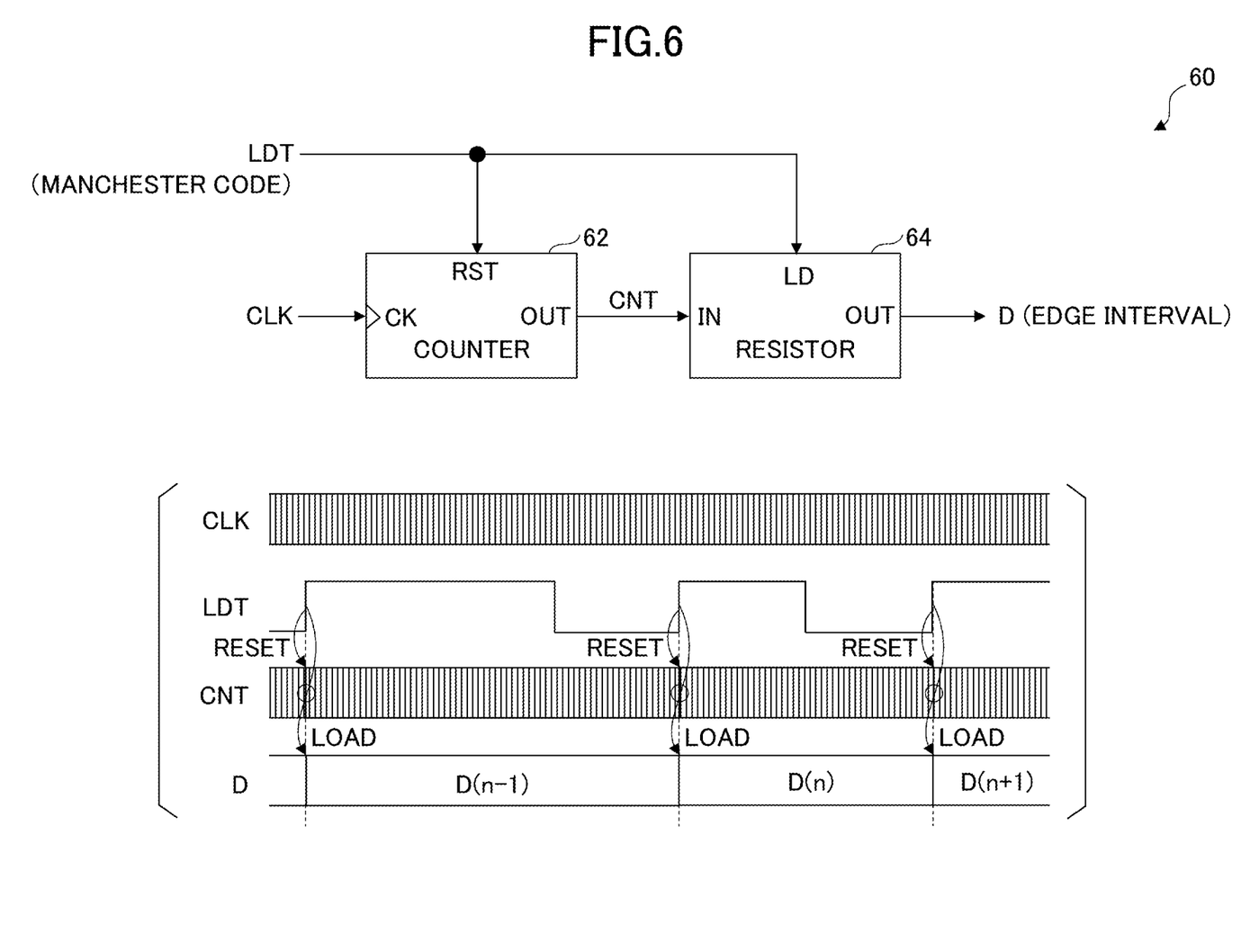
FIG. 6 is a circuit diagram illustrating an example of a single-edge interval counter of FIG. 1.
Figure 7:
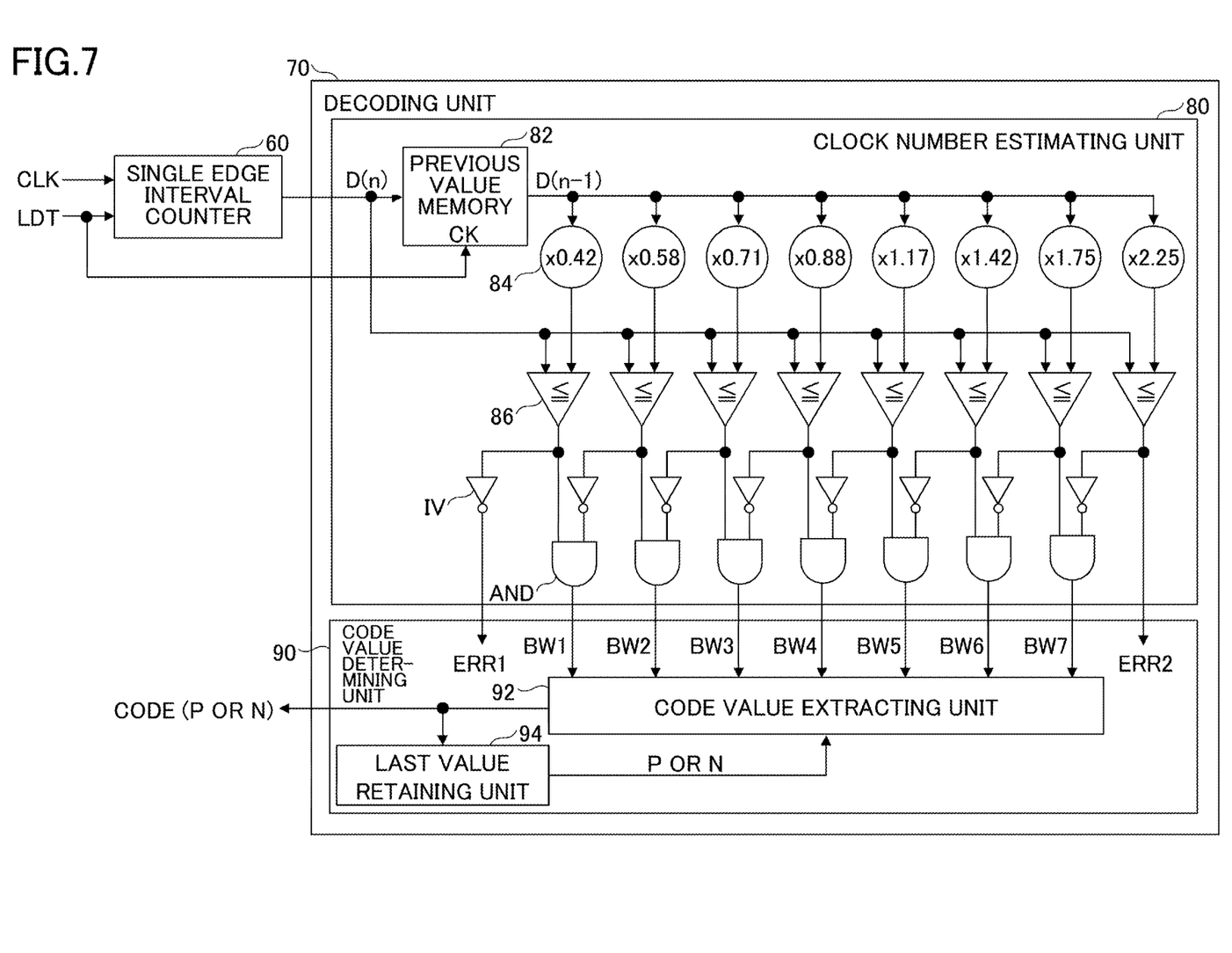
FIG. 7 is a circuit diagram showing an example of a decoding unit of FIG. 1.

Examples of the single-edge interval counter 60 and the decoding unit 70 are illustrated in FIGS. 6 and 7. For example, the transmission monitoring control information and the reception monitoring control information may include information for controlling the on/off of transmitting the optical signal, information for setting the transmitting speed or data rate of the optical signal, information for setting the intensity of the optical signal, and information for indicating the power voltage or temperature of the optical transceiver 100.

[Relationship Between Manchester Code and Edge Interval]

Figure 2:
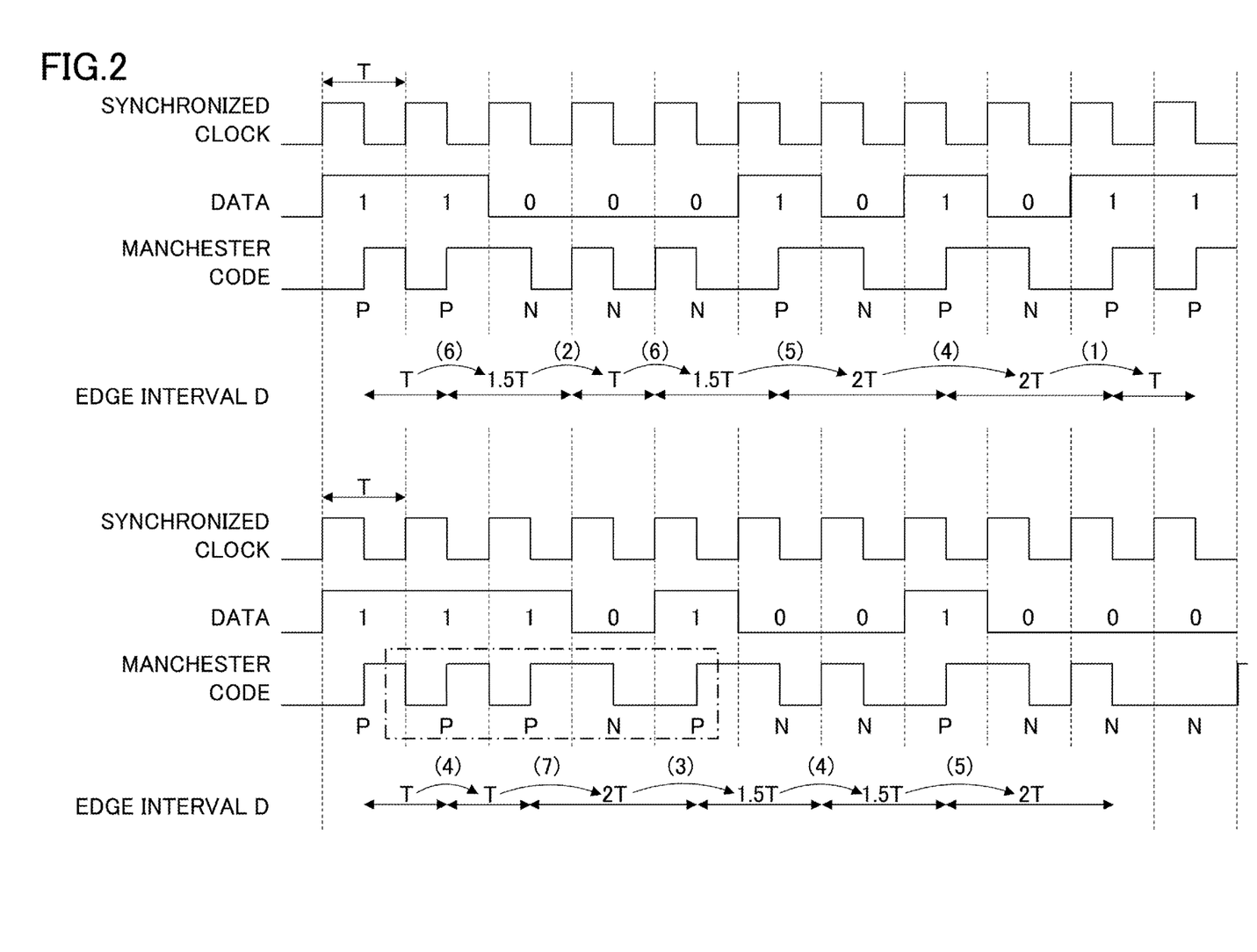
FIG. 2 is a signal waveform diagram illustrating an example of a relationship between Manchester code and an edge interval.

FIG. 2 is a signal waveform diagram illustrating an example of the relationship between Manchester code and an edge interval D. For example, when the data generated in synchronization with the synchronized clock is a logical value 1, the Manchester encoding circuit 20 of FIG. 1 assigns a rising edge (code value P) to the midpoint of the clock cycle. When the data generated in synchronization with the synchronized clock is a logical value 0, the Manchester encoding circuit 20 falls to the middle point of the clock cycle and assigns an edge (code value N). The code value P is an example of the first logical value, and the code value N is an example of the second logical value. In Manchester code, the falling edge may be set to the code value P, and the rising edge may be set to the code value N.

The Manchester encoding circuit 20 then assigns the rising edge or falling edge to a position corresponding to the edge (falling edge) of the synchronized clock in accordance with the edge allocated to the middle of the clock cycle. In the Manchester code generated in this manner, when the period of the synchronized clock, that is, the bit width is "T", the edge intervals D of the two rising edges adjacent to each other are "T", "1.5 T", or "2 T". The edge interval D may be the interval of the falling edges adjacent to each other. Hereinafter, an example of the two rising edges D adjacent to each other will be described.

Figure 3:
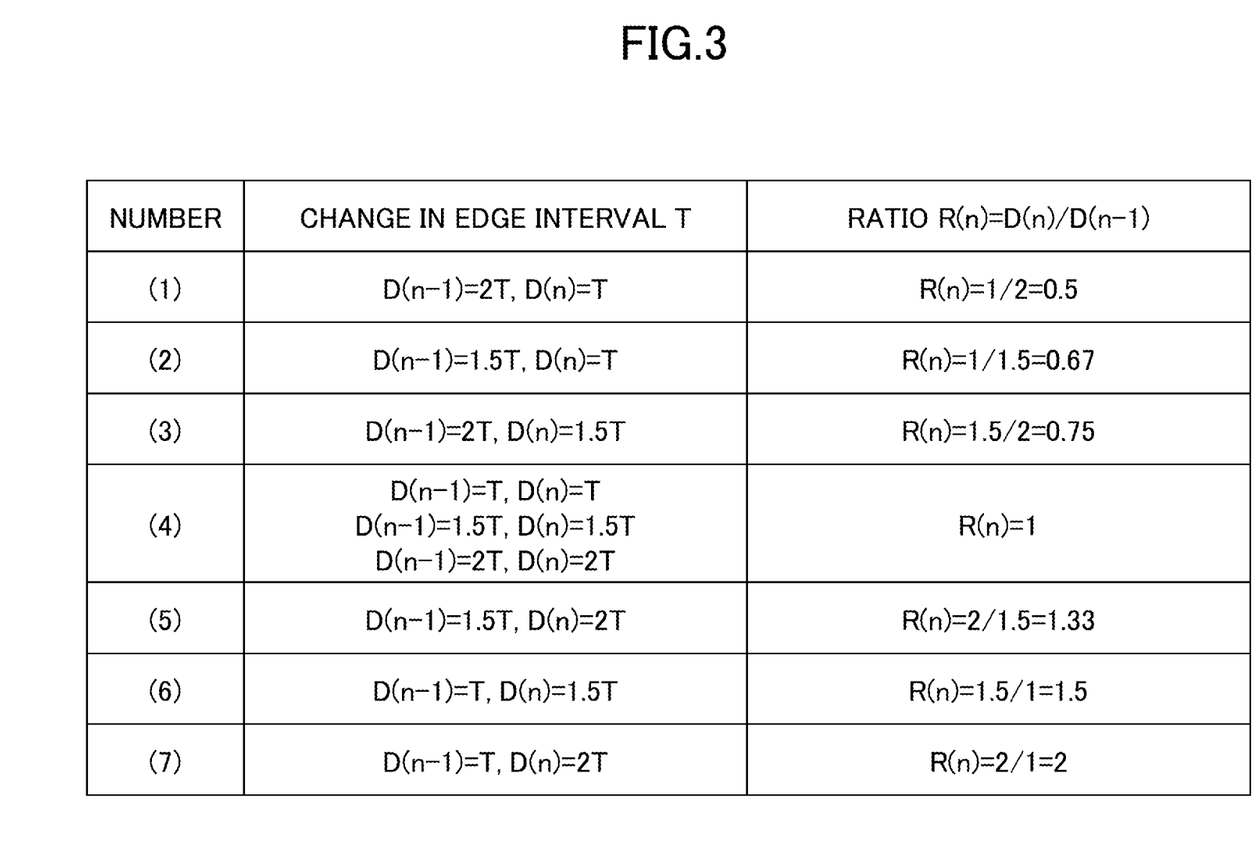
FIG. 3 is an explanatory diagram illustrating an example of a ratio representing a change in two consecutive edge intervals in Manchester code.
Figure 4:
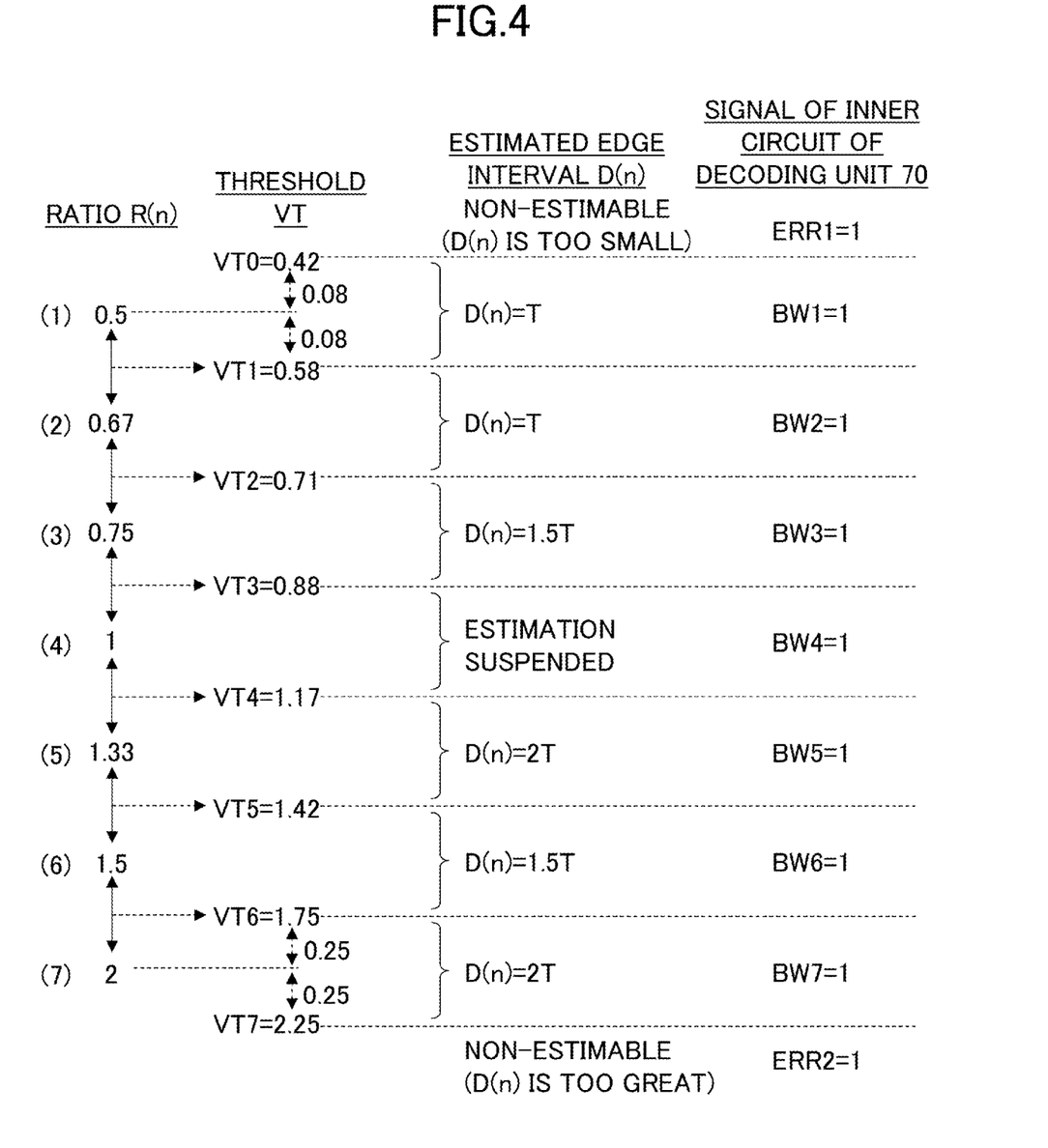
FIG. 4 is an explanatory diagram illustrating an example of a method of estimating an edge interval according to a ratio between two consecutive edge intervals of slowly received data signals.

In FIG. 2, the number indicated by the arc arrow connecting two consecutive edge intervals D correspond to the number of the ratio R(n) of the change in edge interval D illustrated in FIGS. 3 and 4. Of the two consecutive edge intervals D, the first edge interval D(n−1) is an example of a first time interval between the first edge and the second edge immediately after detecting the first edge. Of the two consecutive edge intervals D, the later edge interval D(n) is an example of a second time interval between the second edge and the third edge immediately after the second edge. Furthermore, the next edge interval D(n+1) of the edge interval D(n) is an example of a third time interval between the third edge and the fourth edge immediately after detecting the third edge. The first, second and third edges are rising edges adjacent to each other in the signal waveform of the Manchester code. In the Manchester code of the lower signal waveform illustrated in FIG. 2, the code values P, P, N, and P, which are represented by a single dashed line frame, are the same pattern as the correction pattern inserted at predetermined intervals. The correction pattern is described in FIG. 8.

[Change and Ratio of Edge Interval]

FIG. 3 is a diagram illustrating an example of a ratio R(n) representing changes in two consecutive edge intervals D(n−1) and D(n) in Manchester code. The ratio R(n) is given by a formula (1).

$$R(n) = D(n)/D(n-1) \qquad (1)$$

There are seven different ratios R(n) of the change in edge interval D, as shown in numbers (1) to (7).

If the edge interval D is changed from "2 T" to "T", then the ratio R(n) of change in edge interval D is 0.5. If the edge interval D changes from "1.5 T" to "T", then the ratio R(n) of change in edge interval D is 0.67. If the edge interval D changes from "2 T" to "1.5 T", then the ratio R(n) of change in edge interval D is 0.75.

If the edge interval D remains unchanged ("T" to "T", "1.5 T", to "1.5 T" or "2 T" to "2 T"), then the ratio R(n) of the edge interval D is "1". If the edge interval D changes from "1.5 T" to "2 T", then the ratio R(n) of change in edge interval D is "1.33". If the edge interval D changes from "T" to "1.5 T", then the ratio R(n) of change in edge interval D is 1.5. If the edge interval D is changed from "T" to "2 T", then the ratio R(n) of change in edge interval D is "2".

[Estimation of Bit Width and Decoding of Code Value]

FIG. 4 is a diagram illustrating an example of a method of estimating an edge interval D according to a ratio of two consecutive edge intervals D of a low-speed received data signal. The numbers and ratios R(n) shown in parentheses on the left-hand side of FIG. 4 correspond to the numbers and ratios R(n) shown in FIG. 3. The ratio R(n) is the ratio D(n)/D(n−1) of two successive edge intervals D(n−1), and D(n). The edge interval D(n−1) is a preceding edge interval D, and the edge interval D(n) is a subsequent edge interval D.

In FIG. 4, the median values of the two adjacent ratios R(n) are set to thresholds VT1, VT2, VT3, VT4, VT5, and VT6, respectively. The threshold value VT0 is set to 0.42, which is obtained by subtracting 0.08 of the difference between the threshold value VT1=0.58 and the ratio R(n)=0.5, from the ratio R(n)=0.5. The threshold value VT7 is set to a value (2.25) obtained by adding 0.25 that is the difference between the ratio R(n)=2 and the threshold value VT6=1.75, to the ratio R(n)=2. The threshold values VT0 to VT7 may be collectively referred to as threshold values VT.

For example, the decoding unit 70 obtains a ratio R(n) from the edge interval D(n−1) and the edge interval D(n) that are actually measured. The decoding unit 70 compares the determined ratio R(n) with each threshold value VT. The decoding unit 70 estimates how many times (1 time, 1.5 times, or 2 times) longer is the subsequent edge interval D(n) among the two edge intervals D(n−1) and D(n) than the bit width T based on the comparison result. Here, the bit width T is the period of the synchronized clock used in Manchester encoding. Hereinafter, the ratio of the edge interval D to the bit width T (clock period) is also referred to as the clock number. For example, if the edge interval D is 1.5 times longer than the bit width T, the clock number of the edge interval D is "1.5".

Figure 5:
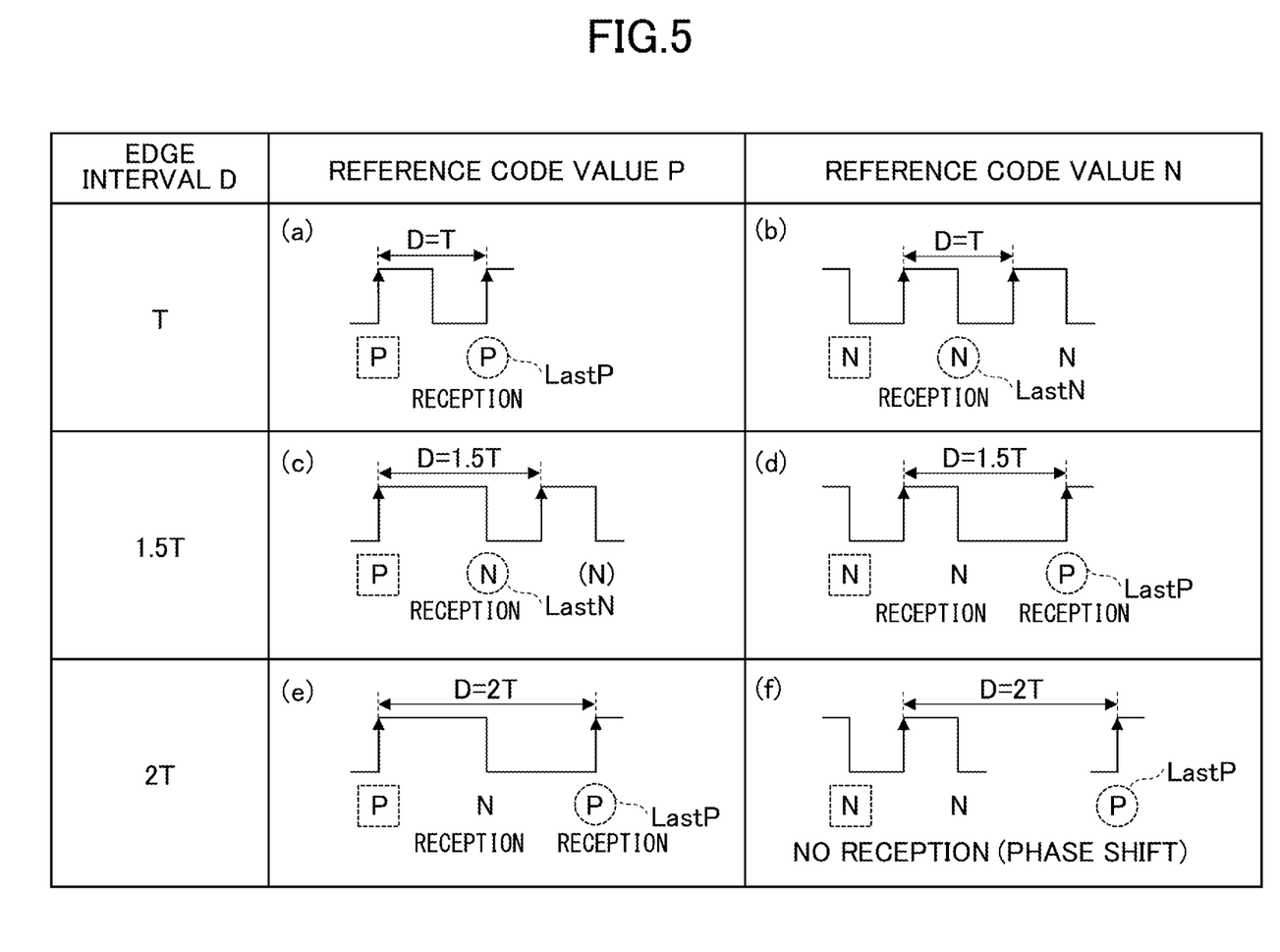
FIG. 5 is an explanatory diagram illustrating an example of a method of decoding a code value based on an edge interval of a slowly received data signal and a code value decoded immediately before.

By estimating the number of clocks in the edge interval D, a Manchester encoded code value included in the low speed received data signal LDT can be decoded, as illustrated in FIG. 5. In addition, because the number of clocks of the edge interval D can be estimated, the code value can be decoded even when the period of the synchronized clock used in Manchester encoding is unknown or when the period of the synchronized clock used in Manchester encoding varies. In other words, each time the ratio R(n) is obtained, the period of the synchronized clock can be estimated and the period of the synchronized clock can be updated.

For example, when the ratio R(n) is "0.75", the period of the synchronized clock, that is, the bit width T, can be estimated by dividing the estimated edge interval D(n) by "1.5". When the ratio R(n) is "1.33", then the period of the synchronized clock, that is, the bit width T, can be estimated by dividing the estimated edge interval D(n) by "2". Incidentally, the period of the synchronized clock, that is, the bit width T, may be estimated based on the average value obtained by dividing the sum of the edge interval D(n−1) and D(n) by 2.

In (3) of FIG. 4, the bit width T may be estimated not by multiplying the edge interval D(n) by 1/1.5, but by multiplying the edge interval D(n−1) by ½. In (6) and (7) of FIG. 4, the bit width T may estimate the edge interval D(n−1) as the bit width T rather than using the edge interval D(n). In this case, the period of the synchronized clock can be calculated without calculation or by shifting the binary bit string representing the edge interval D(n−1) to the right by one bit, thereby reducing the amount of calculation.

The decoding unit 70 determines that the edge intervals D(n−1) and D(n) are equal to each other when the ratio R (n) is greater than "0.88" and less than or equal to "1.17". In this case, the edge intervals D(n−1) and D(n) are, for example, any of "T", "1.5 T", or "2 T", and are not determined. Therefore, the decoding unit 70 suspends the estimation of the edge interval D(n). Even when the estimation of the edge interval D is suspended, the decoding unit 70 can decode the code value included in the low speed received data signal LDT using the method described in FIG. 5. For example, when the edge interval is established in the edge interval D(n−1), the edge interval of the edge interval D(n−1) may be made the edge interval D(n).

When the ratio R(n) is less than or equal to the threshold value VT0, the decoding unit 70 determines that the edge interval D(n) is too small to be estimated. When the ratio R(n) is greater than the threshold value VT7, the decoding unit 70 determines that the edge interval D(n) is too large to be estimated.

When the decoding unit 70 has determined that estimation is not possible, the decoding unit 70 performs the acquisition of the ratio R(n) of the edge interval D from the beginning again. In this case, the decoding unit 70 obtains the ratio R(n+2)=D(n+2)/D(n+1) of the next edge interval D(n+1) of the edge interval D(n) and the further next edge interval D(n+2). Edge interval D (n+1) is an example of a third time interval between the third edge and the fourth edge immediately after detecting the third edge. Edge interval D (n+2) is an example of a fourth time interval between the fourth edge and the fifth edge detected immediately after detecting the fourth edge. The third, fourth, and fifth edges are rising edges adjacent to each other in the signal waveform of the Manchester code.

In this manner, by setting the upper and lower limit values of the ratio R(n) as the threshold values VT0 and VT7, it is possible to detect an edge erroneously caused by noise or the like, changes in transmission rate of the Manchester code, or an interruption of transmission of the low-speed received data signal LDT. In this case, the decoding unit 70 causes the single-edge interval counter 60 to start again from the measurement of the first edge interval D(n−1). Thus, the decoding unit 70 can resume decoding of the low speed received data signal LDT based on the ratio R(n) between the new edge intervals D(n−1) and D(n).

The symbols ERR1=1, BW1=1, BW2=1, BW3=1, BW4=1, BW5=1, BW6=1, BW7=1, and ERR2=1 on the right side of FIG. 4 are the values of the signals used in the decoding unit 70 illustrated in FIG. 7, and only one of them is set to the logical value 1. The codes ERR1 and ERR2 are error signals, and each of the codes BW1 to BW7 is a bit width signal. Incidentally, in some cases, each of the bit width signals BW1 to BW7 is collectively referred to as a bit width signal BW.

For example, the bit width signal BW1 of the logical value 1 and the bit width signal BW2 of the logical value 1 indicate that the clock number of the edge interval D(n) is "1", and indicate that the edge interval D(n) is approximately equal to the bit width T (clock period). The bit width signal BW3 of the logical value 1 and the bit width signal BW6 of the logical value 1 indicate that the clock number of the edge interval D(n) is "1.5", and indicate that the edge interval D(n) is approximately equal to 1.5 times the bit width T (clock period).

The bit width signal BW5 of the logical value 1 and the bit width signal BW7 of the logical value 1 indicate that the number of clocks of the edge interval D(n) is "2", and indicate that the edge interval D(n) is approximately equal to twice the bit width T (clock period). Thus, the bit width signal BW indicates the estimated result of how many times the edge interval D(n) is the bit width T of the synchronized clock used in the Manchester coding.

<Method of Decoding Code Value from Edge Interval>

FIG. 5 is an explanatory diagram illustrating an example of a method for decoding a code value based on an edge interval D of a low-speed received data signal LDT and a code value immediately decoded before. FIG. 5 illustrates a decoding operation by the decoding unit 70 of FIG. 1. In FIG. 5, the edge interval D illustrates the intervals of two rising edges adjacent to each other in the signal waveform of the low-speed received data signal LDT. As illustrated in FIG. 2, the edge interval D is either "T", "1.5 T", or "2 T".

The reference code value P indicated by the dashed rectangular frame indicates that the last decoded code value is "P". The reference code value N indicated by the dashed rectangular frame indicates that the last decoded code value is "N". The dashed circle indicates the last code value among the code values determined by decoding. When the last determined code value is "P", the last determined code value is expressed as "LastP", and when the last determined code value is "N", the last determined code value is expressed as "LastN". When the determined code value is one, the determined code value is "LastP" or "LastN". The "LastP" becomes a reference code value P at the time of the next code value determination. The "LastN" becomes a reference code value N at the time of the next code value determination.

When the reference code value is "P" and the edge interval D is "T" (see FIG. 5(*a*)), the decoding unit 70 determines that the code value P is received. When the reference code value is "N" and the edge interval D is "T" (see FIG. 5(*b*)), the decoding unit 70 determines that the code value N is received.

When the reference code value is "P" and the edge interval D is "1.5 T" (see FIG. 5(*c*)), the decoding unit 70 determines that the code value N is received. Incidentally, the code value N represented by parentheses following the received code value N is decoded the next time. When the reference code value is "N" and the edge interval D is "1.5 T" (see FIG. 5(*d*)), the decoding unit 70 determines that the code value N and the code value P are received.

When the reference code value is "P" and the edge interval D is "2T" (see FIG. 5(*e*)), the decoding unit 70 determines that the code value N and the code value P are received. When the reference code value is "N" and the edge interval D is "2T" (see FIG. 5(*f*)), because the pattern is not present in the Manchester code, the decoding unit 70 determines that a phase shift has occurred and does not determine the received code value. However, the decoding unit 70 can determine the code value at the next appearing edge interval D by determining that the rising edge of the latter half is "LastP".

As illustrated by the waveform in FIG. 2, the decoding unit 70 decodes Manchester code using two consecutive edge intervals D. For example, the decoding unit 70 determines one or two code values based on the ratio R(n) between the edge interval D(n−1) and the edge interval D(n), and determines one or two code values based on the ratio R(n+1) of the edge interval D(n) and the edge interval D(n+1). As described above, of the edge intervals D(n−1) and D(n) used for the determination of the code value, the later edge interval D(n) is used for the determination of the following code value. As a result, the decoding unit 70 can sequentially determine consecutive code values of the Manchester code using consecutive pairs of two edge intervals D.

[Circuit Configuration of Single-Edge Interval Counter]

FIG. 6 is a circuit diagram illustrating an example of the single-edge interval counter 60 of FIG. 1. The single-edge interval counter 60 includes a counter 62 and a register 64. The single-edge interval counter 60 is an example of an interval measuring unit that repeatedly measures the edge distance D of the rising edges adjacent to each other of the low-speed received data signal LDT. The single-edge interval counter 60 detects the rising edge, but may detect the falling edge.

However, the single-edge interval counter 60 detects only a predetermined rising edge or falling edge.

The counter 62 includes a reset terminal RST, a clock terminal CK for receiving a clock signal CLK, and an output terminal OUT for outputting a count value CNT. The reset terminal RST receives a Manchester encoded low-speed received data signal LDT output from the LPF 40 of FIG. 1. The counter 62 resets the count value CNT to "0" in synchronization with the rising edge of the low-speed received data signal LDT and increases the count value CNT by "1" in synchronization with the clock signal CLK.

Thus, the counter 62 outputs the time interval from the rising edge of the low-speed received data signal LDT at each rising edge as the count value CNT. That is, the counter 62 repeatedly measures the edge intervals D of the two rising edges adjacent to each other as a count value CNT.

The register 64 includes a load terminal for receiving a low-speed received data signal LDT, an input terminal IN for receiving a count value CNT, and an output terminal OUT for outputting a loaded count value CNT. The register 64 latches the count value CNT in synchronization with the rising edge of the low-speed received data signal LDT and outputs the latched count value CNT as the edge interval D from the output terminal OUT.

The signal waveform illustrated in the lower brackets of FIG. 6 indicates operation of the single edge interval counter 60. The vertical stripes of the clock signal CLK and the count value CNT in the waveform diagram indicate that the frequency of the clock signal CLK is sufficiently higher than the frequency of the low-speed received data signal LDT. For example, as a clock signal CLK, a frequency dividing clock signal may be used that divides the frequency of the clock signal used in the DSP 10 by a predetermined frequency dividing ratio, or other clock signals may be used.

As illustrated in the signal waveform, two rising edges of the low-speed received data signal LDT are required to obtain a single-edge interval D. Further, in order to decode the reception monitoring control information by the decoding unit 70, two consecutive edge intervals D (for example, D(n−1) and D(n)) are required.

The single-edge interval counter 60 may repeatedly measure the edge interval D of the falling edges adjacent to each other of the low-speed received data signals LDT. In this case, the counter 62 is reset at the falling edge of the low-speed received data signal LDT. The register 64 latches the count value CNT in synchronization with the falling edge of the low-speed received data signal LDT and outputs the latched count value CNT as the edge interval D from the output terminal OUT. However, the configuration and operation of the decoding unit 70 when measuring the edge distance D of the falling edge are different from the configuration and operation of the decoding unit 70 described below.

[Circuit Configuration of Decoding Unit]FIG. 7 is a circuit diagram showing an example of the decoding unit 70 of FIG. 1. The decoding unit 70 includes a clock number estimating unit 80 and a code value determining unit 90. The clock number estimating unit 80 includes a previous value memory 82, eight multipliers 84, eight comparators 86, eight inverters IV, and seven AND circuits. The number of the multipliers 84, the comparators 86, the inverters IV, and the AND circuits AND are set according to the number (type) of the ratio R(n) shown in FIG. 3.

The previous value memory 82 captures the edge interval D(n) received from the single-edge interval counter 60 in synchronization with the rising edge of the low-speed received data signal LDT received at the clock terminal CK and outputs the edge interval D(n) as an edge interval D(n−1). The edge interval D(n−1) output from the previous value memory 82 is supplied to each multiplier 84.

The edge interval D(n) input to the previous value memory 82 is the edge interval D of the two rising edges on the slower side of the three rising edges of the low-speed received data signal LDT, as illustrated in the signal waveform of FIG. 6. That is, the edge interval D(n) is a subsequent edge interval D of the two edge intervals D(n−1) and D(n).

The edge interval D(n−1) output from the previous value memory 82 is the edge interval D of the two rising edges on the earlier side of the three rising edges of the low-speed received data signal LDT, as illustrated in the signal waveform of FIG. 6. That is, the edge interval D(n−1) is the prior edge interval D of the two consecutive edge intervals D(n−1) and D(n). The previous value memory 82 is an example of a storage unit that stores the two consecutive edge intervals D(n−1) and D(n) of the low-speed received data signal LDT.

Each of the multipliers 84 multiplies the edge interval D(n−1) by different multipliers and outputs the multiplication results to the comparator 86. The multipliers used in the eight multipliers 84 are "0.42", "0.58", "0.71", "0.86", "1.17", "1.42", "1.752, and "2.25", and the threshold values VT0, VT1, . . . , VT7 described in FIG. 4.

Each of the comparators 86 compares the multiplication result output from the corresponding multiplier 84 with the edge interval D(n), and outputs the comparison result. Each of the comparators 86 outputs the logical value 1 when the edge interval D(n) is larger than the multiplication result, and outputs the logical value 0 when the edge interval D(n) is smaller than the multiplication result.

The circuit illustrated in FIG. 7 is configured by using a formula (2), which is a modification of the formula (1) described in FIG. 3.

$$D(n) = R(n) \cdot D(n-1) \qquad (2)$$

Each of the multipliers 84 calculates the right-hand side of the formula (2), and the comparator 86 compares the left-hand side and the right-hand side of the formula (2). That is, the comparator 86 compares the edge interval D(n) with the threshold value R(n)•D(n−1).

Thus, the ratio R(n) and the threshold VT can be compared by multiplying the edge interval D(n−1) and each threshold VT without performing the division shown in the formula (1). As a result, the circuit size of the decoding unit 70 can be inhibited, and the cost of the optical transceiver 100 can be reduced. The circuit configuration of the clock number estimating unit 80 is not limited to FIG. 7.

The threshold R(n)•D(n−1) varies depending on the edge interval D(n−1). That is, the clock number estimating unit 80 can update the threshold value each time the previous edge interval D(n−1) is measured, and can compare the threshold value with the edge interval D(n). Accordingly, even when the frequency of the synchronized clock used in Manchester encoding changes, or when a synchronized clock jitter or the like occurs, the threshold value can be updated following the change in frequency, jitter, or the like. As a result, the accuracy of decoding by the Manchester decoding circuit 50 can be improved compared to when the threshold is fixed, and the reliability of the optical transceiver 100 can be improved.

Each of the AND circuits AND receives a logical value output from the corresponding comparator 86 and a logical value inverted by an inverter IV after being output from the right side comparator 86 of the corresponding comparator 86 by being generated by the right side comparator by inputting a signal after multiplying a multiplying factor greater than the multiplying factor of the corresponding comparator 86 by one. Each AND circuit AND outputs the logic operation result as the bit width signal BW (BW1, BW2, BW7) to the code value determining unit 90.

The logical value output from the leftmost-side comparator 86 of FIG. 7 is inverted by the inverter IV and output to the code value determining unit 90 as the error signal ERR1. The logical value output from the comparator 86 on the rightmost side of FIG. 7 is output to the code value determining unit 90 as the error signal ERR2.

For example, when the edge interval D(n−1) and D(n) are both "1", the comparators 86 corresponding to four multipliers 84 having multiplying factors from 0.42-fold to 0.88-fold outputs a logical value of 1, and the comparator 86 corresponding to four multipliers 84 having multiplying factors from 1.17-fold to 2.25-fold outputs a logical value of 0. In this case, the clock number estimating unit 80 outputs the bit width signal BW4 of the logical value 1, the bit width signals BW1 to BW3 and BW5 to BW7 of the logical value 0, and the error signals ERR1 and ERR2. That is, the bit width signal BW4 of the logical value 1 indicates that the ratio R(n) is greater than 0.88 and less than or equal to 1.17.

Also, when the edge interval D(n−1) is "1" and the edge interval D(n) is "2", the comparators 86 corresponding to seven multipliers 84 of 0.42-fold to 1.75-fold output a logical value 1, and the comparator 86 corresponding to 2.25-fold multiplier 84 outputs a logical value 0. In this case, the clock number estimating unit 80 outputs the bit width signal BW7 of the logical value 1, the bit width signals BW1 to BW6 of the logical value 0, and the error signals ERR1 and ERR2. That is, the bit width signal BW7 of the logical value 1 indicates that the ratio R(n) is greater than 1.75 and less than or equal to 2.25.

When the edge interval D(n−1) is "1" and the edge interval D(n) is "3", then all of the comparators 86 output a logical value 1. In this case, the clock number estimating unit 80 outputs the error signal ERR1 of the logical value 1, the bit width signals BW1 to BW7 of the logical value 0, and the error signal ERR2. That is, the error signal ERR1 of the logical value 1 indicates that the ratio R(n) is less than or equal to 0.42.

When the edge interval D(n−1) is "3" and the edge interval D(n) is "1", then all of the comparators 86 output a logical value 0. In this case, the clock number estimating unit 80 outputs the error signal ERR2 of the logical value 1, the error signal ERR1 of the logical value 0, and the bit width signals BW1 to BW7. That is, the error signal ERR2 of logical value 1 indicates that the ratio R(n) is greater than 2.25.

The code value determining unit 90 includes a code value extracting unit 92 and a last value retaining unit 94. The code value extracting unit 92 extracts the code value included in the received low-speed received data signal LDT based on the logical value of the bit width signals BW1 to BW7 output from the clock number estimating unit 80 and the code value (P or N) retained by the last value retaining unit 94. The code value retained by the last value retaining unit 94 is the code value extracted by the code value extracting unit 92 immediately before.

Extraction of the code value by the code value extracting unit 92 is performed according to the method for decoding the code value illustrated in FIG. 5. The code value decoded immediately before the state shown by the dashed line rectangular frame in FIG. 5 is retained in the last value retaining unit 94 and is used to extract the code value in the code value extracting unit 92. The LastP or LastN illustrated in FIG. 5 by a dashed line circle is the last code value extracted by the code value extracting unit 92 and is retained in the last value retaining unit 94. The decoding unit 70 outputs the code value extracted by the code value extracting unit 92 as the reception monitoring control information to the host device.

The decoding unit 70 illustrated in FIG. 7 can decode the Manchester encoded code value by comparing the ratio R(n) between the two consecutive edge intervals D(n−1) and D(n) with the threshold value VT in the low-speed received data signal LDT. In other words, the clock number estimating unit 80 can obtain the clock number of the edge interval D(n) by comparing the threshold value R(n)·D(n−1) updated each time the previously measured edge interval D(n−1) is updated with the edge interval D(n).

Generally, when information is encoded by Manchester encoding, a synchronization bit string such as a preamble is inserted at any timing. Insertion of the synchronization bit string prevents only many code values P or only many code values N from being consecutive.

For this reason, the Manchester decoding circuit 50 can successively estimate the number of clocks of the edge interval D by continuing to receive the low-speed received data signal LDT and sequentially decode the Manchester code. That is, once the low-speed received data signal LDT is successfully decoded, decoding of the low-speed received data signal LDT can be continued using the method illustrated in FIG. 5.

[Manchester Decoding Circuit State Transition Diagram]

Figure 8:
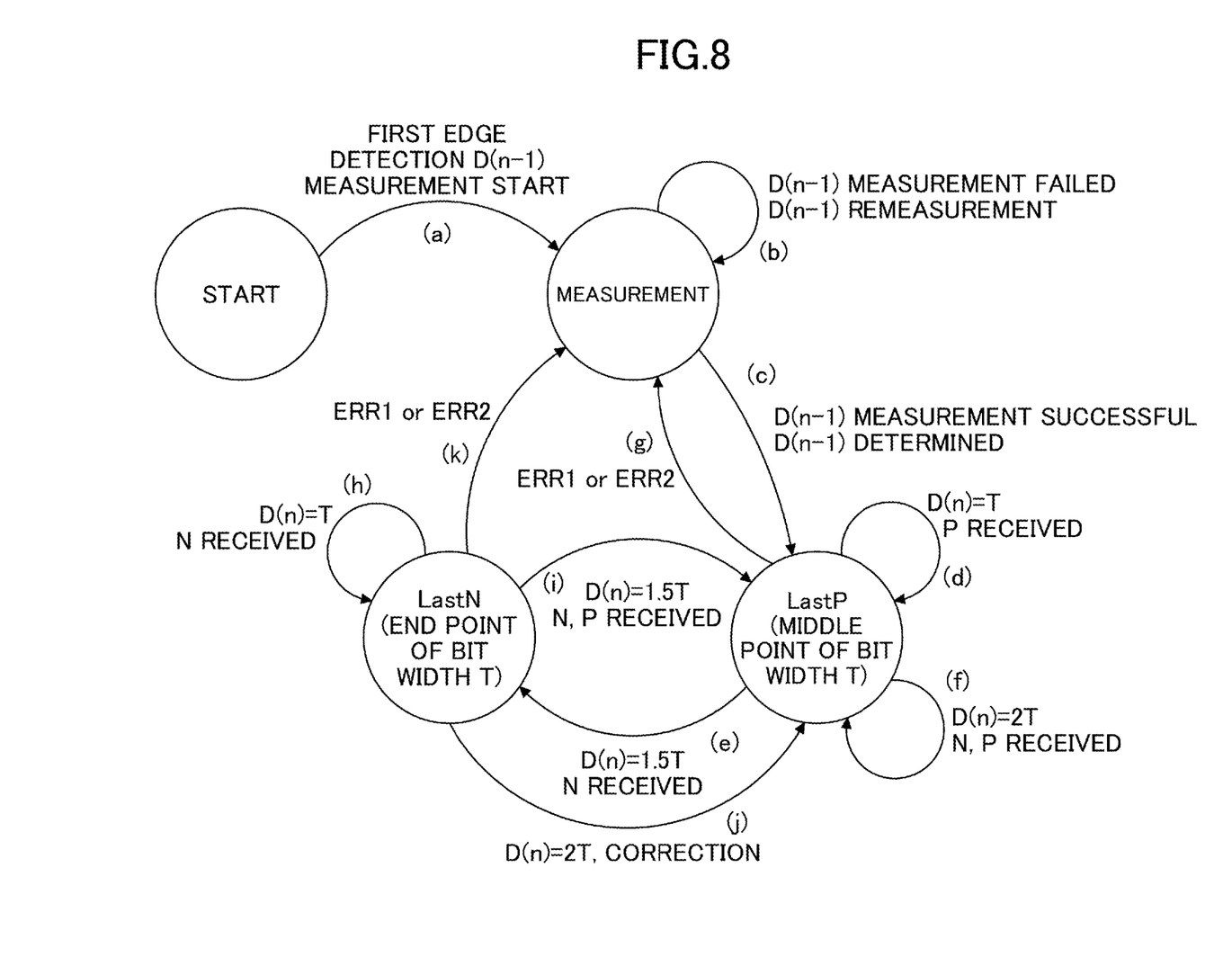
FIG. 8 is a state transition diagram illustrating an example of an operation of a Manchester decoding circuit of FIG. 1.

FIG. 8 is a state transition diagram illustrating an example of operation of the Manchester decoding circuit 50 of FIG. 1. The Manchester decoding circuit 50 has a start state, a measurement state, a LastP state, and a LastN state. In the LastP state, the decoding unit 70 illustrated in FIG. 7 determines the code value according to the method for determining the reference code value P illustrated in FIG. 5. In the LastN state, the decoding unit 70 determines the code value according to the method for determining the reference code value N illustrated in FIG. 5.

First, in the start state, the single-edge interval counter 60 starts receiving the Manchester encoded low-speed received data signal LDT. When the first rising edge is detected, the single-edge interval counter 60 changes to the measurement state of the edge interval D(n−1) (see FIG. 8(*a*)). When the first edge interval D(n−1) fails to be measured, the single-edge interval counter 60 resets the count value CNT and remeasures the edge interval D(n−1) (see FIG. 8(*b*)).

When the single-edge interval counter 60 succeeds in measuring the first edge interval D(n−1) by detecting the next rise of the low-speed-receiving data signal LDT, the single-edge interval counter 60 determines the edge interval D(n−1) and transits to the LastP state (see FIG. 8(*c*)). The last value retaining unit 94 retains the code value P as the last value.

As illustrated in FIG. 2, when the code value is "P", the rising edge of the signal is positioned at the middle point of the bit width T (the falling edge of the synchronized clock). When the code value is "N", the falling edge of the signal is positioned at the middle point of the bit width T (the falling edge of the synchronized clock). When the rising edge of the signal is within the synchronized clock, the rising edge of the signal is located at an end point (the rising edge of the synchronized clock) of bit width T.

Therefore, when the edge interval D(n−1) is measured for the first time after the transition to the measurement state, either the LastP state or the LastN state can be taken. In this embodiment, when the edge interval D(n−1) is measured for the first time after the transition to the measurement state, the state is moved to the LastP state as a tentative state. When the edge interval D(n−1) is measured for the first time after the transition to the measurement state, the state of the Manchester decoding circuit 50 may be moved to the LastN state.

In the LastP state or the LastN state, the single-edge interval counter 60 stores the edge interval D(n−1) in the previous value memory 82 when the next rise of the low-speed received data signal LDT is detected. As described in FIG. 7, the clock number estimating unit 80 sets either the bit width signals BW1 to BW7 or the error signals ERR1 and ERR2 to the logical value 1 based on the ratio R(n) (=edge interval D(n)/D(n−1)). That is, receiving the Manchester code starts.

In the LastP state, when the bit width signal BW1 having the logical value 1 representing the edge interval D(n)="T" or the bit width signal BW2 having the logical value 1 is received, the code value extracting unit 92 determines the reception of the code value P and remains in the LastP state (see FIG. 8(*d*)). The last value retaining unit 94 retains the code value P determined by the code value extracting unit 92 as the last value.

In the LastP state, when the bit width signal BW3 of the logical value 1 representing the edge interval D(n)="1.5 T" or the bit width signal BW6 of the logical value 1 is received, the code value extracting unit 92 determines the reception of the code value N and changes the state to the LastN state (see FIG. 8(e)). The last value retaining unit 94 retains the code value N determined by the code value extracting unit 92 as the last value.

In the LastP state, when receiving the bit width signal BW5 of the logical value 1 representing the edge interval D(n)="2 T" or the bit width signal BW7 of the logical value 1, the code value extracting unit 92 determines the reception of the code values N and P and remains in the LastP state (see FIG. 8(f)). The last value retaining unit 94 retains the last determined code value P determined by the code value extracting unit 92 as the Last value.

In the LastP state, when receiving the error signal ERR1 of the logical value 1 or the error signal ERR2 of the logical value 1, the code value determining unit 90 stops operation of repeatedly measuring the edge interval D(n). Then, the code value determining unit 90 transits to the measurement state in order to start the measurement from the first edge interval D(n−1) (see FIG. 8(g)).

The error signal ERR1 of the logical value 1 is output when the edge interval D(n) is too short. The error signal ERR2 of the logical value 1 is output when the edge interval D(n) is too long. This allows the Manchester decoding circuit 50 to resume decoding of the Manchester code again without continuing to detect incorrect code values.

On the other hand, in the LastN state, when receiving the bit width signal BW1 having the logical value 1 representing the edge interval D(n)="T", or the bit width signal BW2 having the logical value 1, the code value extracting unit 92 determines the reception of the code value N and stays in the LastN state (see FIG. 8(h)). The last value retaining unit 94 retains the code value N determined by the code value extracting unit 92 as the last value.

In the LastN state, when receiving the bit width signal BW3 of the logical value 1 representing the edge interval D(n)="1.5 T" or the bit width signal BW6 of the logical value 1, the code value extracting unit 92 determines the reception of the code values N and P, and changes the state to the LastP state (see FIG. 8(i)). The last value retaining unit 94 retains the last determined code value P as the last value determined by the last code value extracting unit 92.

In the LastN state, when receiving the bit width signal BW5 of the logical value 1 representing the edge interval D(n)="2 T", or the bit width signal BW7 of the logical value 1, the code value extracting unit 92 determines that the measurement of the edge interval D(n) was erroneous. The code value extracting unit 92 transits to the LastP state without performing a receiving determination of the code value (see FIG. 8(j)).

In the LastN state, when receiving the error signal ERR1 of the logical value 1 or the error signal ERR2 of the logical value 1, the code value determining unit 90 stops the operation of repeatedly measuring the edge interval D(n). Then, the code value determining unit 90 transits to the measurement state in order to start the measurement from the first edge interval D(n−1) (see FIG. 8(k)). This allows the Manchester decoding circuit 50 to resume decoding of Manchester codes again without continuing to detect incorrect code values.

In the LastP state or the LastN state, when the bit width signal BW4 is a logical value 1, the code value extracting unit 92 of the code value determining unit 90 suspends the estimation of the edge interval D(n). However, the decoding unit 70 can decode the Manchester code using the method illustrated in FIG. 5 even when the estimation of the edge interval D(n) is suspended. For example, when the edge interval is established in the edge interval D(n−1), the edge interval of the edge interval D(n−1) may be made the edge interval D(n).

In addition, when the correction pattern (codes P, P, N, and P) illustrated in FIG. 2 is inserted into the bit string of the Manchester code, the decoding unit 70 detects the edge interval D(n−1) and D(n) having the ratio R (n) of "2". The decoding unit 70 determines the reception of the code value N by outputting the bit width signal BW7 having the logical value 1. Accordingly, the decoding unit 70 can estimate the edge interval D(n) by receiving the correction pattern even when all the bits of the code value P other than the correction pattern are received consecutively and the estimation is suspended by the same edge intervals D(n−1) and D(n).

The decoding unit 70 continues to falsely detect consecutive code values P as consecutive code values N, and even when the LastN state is repeated, the decoding unit 70 changes its state to the LastP state upon receiving the correction pattern. Accordingly, the receiving operation of the code value can be restored to normal, and then the correct code value can be detected.

Thus, in the first embodiment, the optical transceiver 100 can decode the Manchester encoded monitoring signal even when the period of the synchronized clock used in Manchester encoding is unknown or when the period of the synchronized clock varies. Specifically, the optical transceiver 100 can decode a Manchester encoded monitoring signal based on a ratio between two consecutive edge intervals D(n−1) and D(n).

That is, the optical transceiver 100 can decode the Manchester encoded monitoring information, no matter how the period of the synchronized clock used in Manchester encoding is set. Thus, a common optical transceiver 100 can be used to decode various Manchester codes with periods of synchronized clocks used in various host devices.

This reduces the development cost, manufacturing cost, and maintenance cost of the optical transceiver 100 as compared to the case where the optical transceiver 100 is prepared for each system. For example, monitoring information is communicated redundantly to signals that are originally communicated. For this reason, the period of the synchronized clock used in Manchester encoding may be changed depending on the installation environment and operating environment of the system in order to avoid the influence on the communication quality of the PAM4 signal, which is the original communication target, and the like. Again, Manchester encoded monitoring control information can be automatically decoded following changes in period of the synchronized clock.

According to the present disclosure, an optical transceiver capable of decoding a code value of Manchester code can be provided even when a period of a synchronized clock used in Manchester encoding is unknown or when the period of the synchronized clock varies.

As discussed above, although embodiments of the present disclosure have been described, the present disclosure is not limited to the above-described embodiments. Various alternations, modifications, substitutions, additions, deletions, and combinations are possible within the scope of the claims. They are definitely within the technical scope of the present disclosure.

What is claimed is:

1. An optical transceiver configured to receive an optical signal on which a monitoring signal encoded by Manchester encoding is superimposed, the optical transceiver comprising:
   a decoding circuit configured to decode the monitoring signal from an electrical signal generated from the optical signal, the decoding circuit including:
   an interval measuring unit configured to detect only a rising edge or a falling edge of a waveform of the electrical signal, to measure a first time interval between a detected first edge and a second edge detected immediately after detecting the first edge, and to measure a second time interval between the second edge and a third edge detected immediately after detecting the second edge, and
   a decoding unit configured to decode the monitoring signal encoded by the Manchester encoding based on a ratio between the first time interval and the second time interval;
   a clock number estimating unit configured to estimate a number of clocks of the second time interval with respect to a period of a synchronized clock used in the Manchester encoding of the monitoring signal based on the ratio between the first time interval and the second time interval; and
   a code value determining unit configured to decode the monitoring signal encoded by the Manchester encoding based on the estimated number of clocks of the second time interval and a logical value of the monitoring signal decoded immediately before.

2. The optical transceiver as claimed in claim 1, wherein the clock number estimating unit comprises;
   a storage unit configured to store the first time interval,
   a plurality of multipliers multiplying the first time interval by each of a plurality of thresholds, and
   a plurality of comparators configured to compare each of a plurality of multiplication results from the plurality of multipliers to the second time interval,
   wherein the clock number estimating unit is configured to estimate the number of clocks based on a plurality of comparative results from the plurality of comparators.

3. The optical transceiver as claimed in claim 1, wherein the interval measuring unit further measures a third time interval between the third edge and a fourth edge detected immediately after detecting the third edge, and
   wherein the decoding unit is configured to decode a first logical value corresponding to the third edge of the monitoring signal based on the ratio between the first time interval and the second time interval and to decode a second logical value corresponding to the fourth edge of the monitoring signal based on the ratio between the second time interval and the third time interval.

4. The optical transceiver as claimed in claim 1, wherein, upon detecting by the decoding unit that the ratio between the first time interval and the second time interval is out of a predetermined range, the interval measuring unit further measures a third time interval between the third edge and a fourth edge detected immediately after detecting the third edge, and a fourth time interval between the fourth edge and a fifth edge detected immediately after detecting the fourth edge, and
   wherein the decoding unit decodes the monitoring signal based on the ratio between the third time interval and the fourth time interval.

5. The optical transceiver as claimed in claim 1,
   wherein the monitoring signal encoded by the Manchester encoding and received by the decoding circuit includes a correction pattern in which a first logical value, the first logical value, a second logical value, and the first logical value sequentially appear, and
   wherein the first logical value is indicated by a rising edge or a falling edge detected by the interval measuring unit.

6. A method for controlling an optical transceiver configured to receive an optical signal on which a monitoring signal encoded by Manchester encoding is superimposed and to decode the monitoring signal from an electrical signal generated from the optical signal, the method comprising steps of:
   detecting only a rising edge or a falling edge of a waveform of the electrical signal;
   measuring a first time interval between a detected first edge and a second edge detected immediately after detecting the first edge;
   measuring a second time interval between the second edge and a third edge detected immediately after detecting the second edge;
   estimating a number of clocks of the second time interval with respect to a period of a synchronized clock used in the Manchester encoding of the monitoring signal based on the ratio between the first time interval and the second time interval; and
   decoding the monitoring signal encoded by the Manchester encoding based on a ratio between the first time interval and the second time interval, the estimated number of clocks of the second time interval and a logical value of the monitoring signal decoded immediately before.

7. An optical transceiver configured to receive an optical signal on which a monitoring signal encoded by Manchester encoding is superimposed, the optical transceiver comprising:
   a decoding circuit configured to decode the monitoring signal from an electrical signal generated from the optical signal, the decoding circuit including:
   an interval measuring unit configured to detect only a rising edge or a falling edge of a waveform of the electrical signal, to measure a first time interval between a detected first edge and a second edge detected immediately after detecting the first edge, and to measure a second time interval between the second edge and a third edge detected immediately after detecting the second edge; and
   a decoding unit configured to decode the monitoring signal encoded by the Manchester encoding based on a ratio between the first time interval and the second time interval,
   wherein the monitoring signal encoded by the Manchester encoding and received by the decoding circuit includes a correction pattern in which a first logical value, the first logical value, a second logical value, and the first logical value sequentially appear, and
   wherein the first logical value is indicated by a rising edge or a falling edge detected by the interval measuring unit.

8. The optical transceiver as claimed in claim 7, wherein the decoding unit comprises:
   a clock number estimating unit configured to estimate a number of clocks of the second time interval with respect to a period of a synchronized clock used in the Manchester encoding of the monitoring signal based on the ratio between the first time interval and the second time interval; and
a code value determining unit configured to decode the monitoring signal encoded by the Manchester encoding based on the estimated number of clocks of the second time interval and a logical value of the monitoring signal decoded immediately before.

9. The optical transceiver as claimed in claim 8,
wherein the clock number estimating unit comprises:
a storage unit configured to store the first time interval;
a plurality of multipliers multiplying the first time interval by each of a plurality of thresholds, and
a plurality of comparators configured to compare each of a plurality of multiplication results from the plurality of multipliers to the second time interval,
wherein the clock number estimating unit is configured to estimate the number of clocks based on a plurality of comparative results from the plurality of comparators.

10. The optical transceiver as claimed in claim 7,
wherein the interval measuring unit further measures a third time interval between the third edge and a fourth edge detected immediately after detecting the third edge, and
wherein the decoding unit is configured to decode a first logical value corresponding to the third edge of the monitoring signal based on the ratio between the first time interval and the second time interval and to decode a second logical value corresponding to the fourth edge of the monitoring signal based on the ratio between the second time interval and the third time interval.

11. The optical transceiver as claimed in claim 7,
wherein, upon detecting by the decoding unit that the ratio between the first time interval and the second time interval is out of a predetermined range, the interval measuring unit further measures a third time interval between the third edge and a fourth edge detected immediately after detecting the third edge, and a fourth time interval between the fourth edge and a fifth edge detected immediately after detecting the fourth edge, and
wherein the decoding unit decodes the monitoring signal based on the ratio between the third time interval and the fourth time interval.

* * * * *